United States Patent
Ihara et al.

(10) Patent No.: US 7,152,000 B2
(45) Date of Patent: Dec. 19, 2006

(54) VEHICLE TRAVELING STATE DETERMINING APPARATUS

(75) Inventors: Toru Ihara, Tokyo (JP); Keiichi Yamamoto, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 85 days.

(21) Appl. No.: 11/084,720

(22) Filed: Mar. 18, 2005

(65) Prior Publication Data

US 2005/0251336 A1 Nov. 10, 2005

(30) Foreign Application Priority Data

Mar. 19, 2004 (JP) ............... 2004-080680

(51) Int. Cl.
*G06F 17/10* (2006.01)
(52) U.S. Cl. ..................... 701/301; 348/118
(58) Field of Classification Search ................. 701/41, 701/70, 71, 96, 1, 300, 301, 302; 348/113, 348/118, 119; 340/575; 382/199
See application file for complete search history.

(56) References Cited

U.S. PATENT DOCUMENTS

| | | | | |
|---|---|---|---|---|
| 6,831,591 B1 * | 12/2004 | Horibe | ........................ | 342/52 |
| 6,845,172 B1 * | 1/2005 | Furusho | ..................... | 382/104 |
| 6,879,890 B1 * | 4/2005 | Matsumoto et al. | .......... | 701/23 |
| 6,925,206 B1 * | 8/2005 | Akutagawa | ................. | 382/173 |
| 6,973,380 B1 * | 12/2005 | Tange et al. | .................. | 701/70 |
| 7,006,667 B1 * | 2/2006 | Akutagawa | ................. | 382/104 |
| 7,084,772 B1 * | 8/2006 | Oyama | ....................... | 340/575 |

FOREIGN PATENT DOCUMENTS

| | | |
|---|---|---|
| JP | 2830475 B2 | 9/1998 |
| JP | 3039327 | 3/2000 |
| WO | WO95/18433 A1 | 7/1995 |

OTHER PUBLICATIONS

Kitajima, H. et al., "Prediction of Automobile Driver Sleepiness," Transactions of the Japan Society of Mechanical Engineers, Sep. 1997, No. 96-1780, pp. 93-100.

* cited by examiner

*Primary Examiner*—Richard M. Camby
(74) *Attorney, Agent, or Firm*—Rossi, Kimms & McDowell, LLP

(57) ABSTRACT

The present invention provides zigzag state detecting section which is comprised of white line determining section for determining parts of the road surface which are similar to white lines, white line position detecting section for detecting positions, approximating section for approximating the positions, left-hand zigzag amount determining means for calculating a zigzag amount of a left-hand boundary, right-hand zigzag amount determining section for calculating a zigzag amount of a right-hand boundary, and calculating section for calculating an average zigzag amount of the vehicle on the basis of results of the calculations by the left-hand zigzag amount calculating section and the right-hand zigzag amount calculating section.

5 Claims, 4 Drawing Sheets

VEHICLE TRAVELING STATE DETERMINING APPARATUS

CROSS-REFERENCE TO RELATED APPLICATIONS

This application is based upon and claims the benefit of priority from prior Japanese Patent Application No. 2004-080680, filed Mar. 19, 2004, the entire contents of which are incorporated herein by reference.

BACKGROUND OF THE INVENTION

1. Field of the Invention

The present invention relates to a vehicle traveling state determining apparatus that can determine whether or not, for example, a driver's awoken state is impeded during driving, so that the driver is falling asleep at the wheel.

2. Description of the Related Art

In recent years, with the development of a road network and an increase in leisure hours, there have been an increasing number of opportunities for driving a car. The driver is desired to be always physically and mentally stable during driving. However, the driver may drive a car while conscious of his or her bad physical condition. In this case, during long continuous driving, the driver's fatigue keeps piling up and his or her concentration lowers. Consequently, the driver's awoken state may be impeded and the driver may become sleepy.

To prevent this, a vehicle is provided with a camera that picks up a frontal image that allows white lines on roads to be recognized to determine whether or not the vehicle is traveling in a zigzag line. This system thus determines whether or not the driver is falling asleep at the wheel. If the result of the determination is affirmative, the system gives a warning (for example, Japanese Patent No. 3039327).

This technique recognizes white lines on the opposite sides of a road.

Thus, if white lines are not easy to see as in the case of a snowy road, it is impossible to determine whether or not the vehicle is traveling in a zigzag line.

BRIEF SUMMARY OF THE INVENTION

It is an object of the present invention to provide a vehicle traveling state determining apparatus that can determine whether or not a vehicle is traveling in a zigzag line even if white lines are not easy to see as in the case of a snowy road.

According to one aspect of the present invention, there is provided a traveling state determining apparatus comprising:

a camera that picks up an image of a road surface in a direction in which a vehicle is traveling; and zigzag state detecting section configured to determine a zigzag amount on the basis of the road surface image picked up using the camera, wherein the zigzag state detecting section is comprised of:

white line determining section configured to determine parts of the road surface which are similar to white lines;

white line position detecting section configured to detect positions determined to be white lines in a lateral direction with respect to a center of the road surface image;

approximating section configured to approximate the positions detected by the detecting section and determined to be white lines, using a straight line extending toward a null;

left-hand zigzag amount calculating and determining section configured to calculate a zigzag amount of a left-hand boundary on the basis of the left-hand straight line approximated by the approximating section;

right-hand zigzag amount determining section configured to calculate a zigzag amount of a right-hand boundary on the basis of the right-hand straight line approximated by the approximating section; and calculating section for calculating an average zigzag amount of the vehicle on the basis of results of the calculations by the left-hand zigzag amount calculating section and the right-hand zigzag amount calculating section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
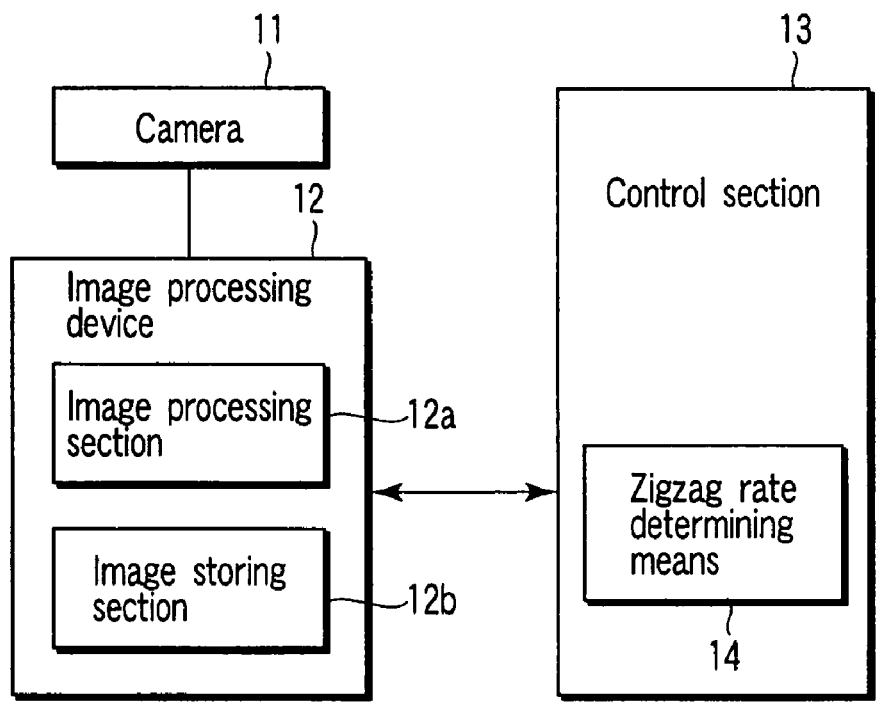
FIG. 1 is a block diagram illustrating a vehicle traveling state determining apparatus according to an embodiment of the present invention.

An embodiment of the present invention will be described with reference to the drawings. FIG. 1 is a block diagram showing a vehicle traveling state determining apparatus. In the figure, reference numeral 11 denotes a CCD camera. An image of a road surface in front of a vehicle is picked up using the camera. The image is then input to an image processing device 12. The image processing apparatus 12 has an image processing section 12a that processes the image picked up using the camera 11 and an image data storing section 12b that stores image data processed by the image processing section 12a.

The image processing device 12 is connected to the control section 13. The control section 13 is mainly composed of a microprocessor and includes zigzag rate determining means 14.

Figure 2:
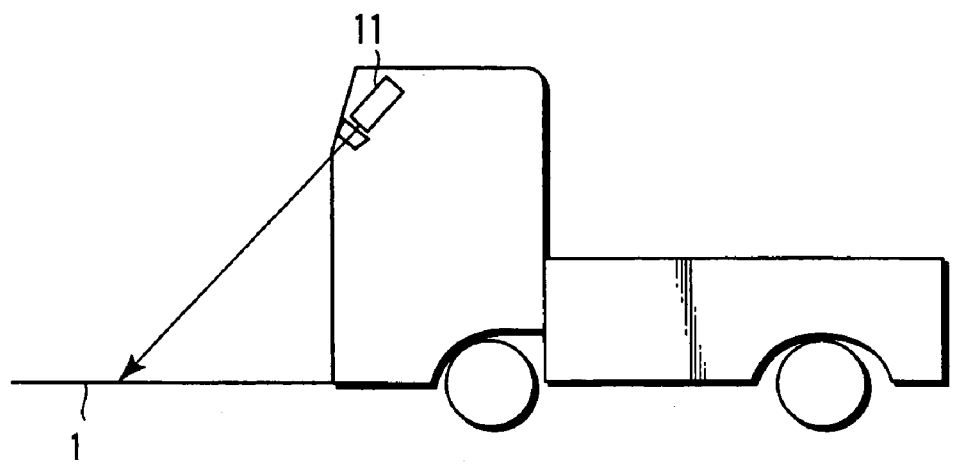
FIG. 2 is a diagram showing where a camera is mounted in the vehicle traveling state determining apparatus according to the embodiment.
Figure 4:
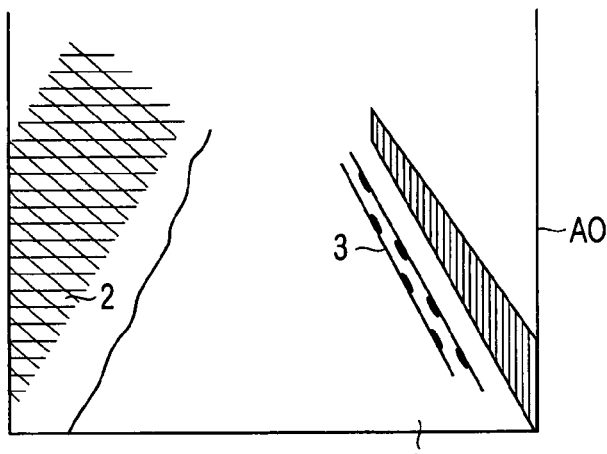
FIG. 4 is a diagram showing an image of the front of a vehicle picked up using the camera mounted in the vehicle.

The camera 11 is mounted, for example, at the top of the center of a cabin of the vehicle as shown in FIG. 2. The camera 11 picks up a road surface 1 in front of the vehicle in its traveling direction. FIG. 4 shows an image.

Figure 3:
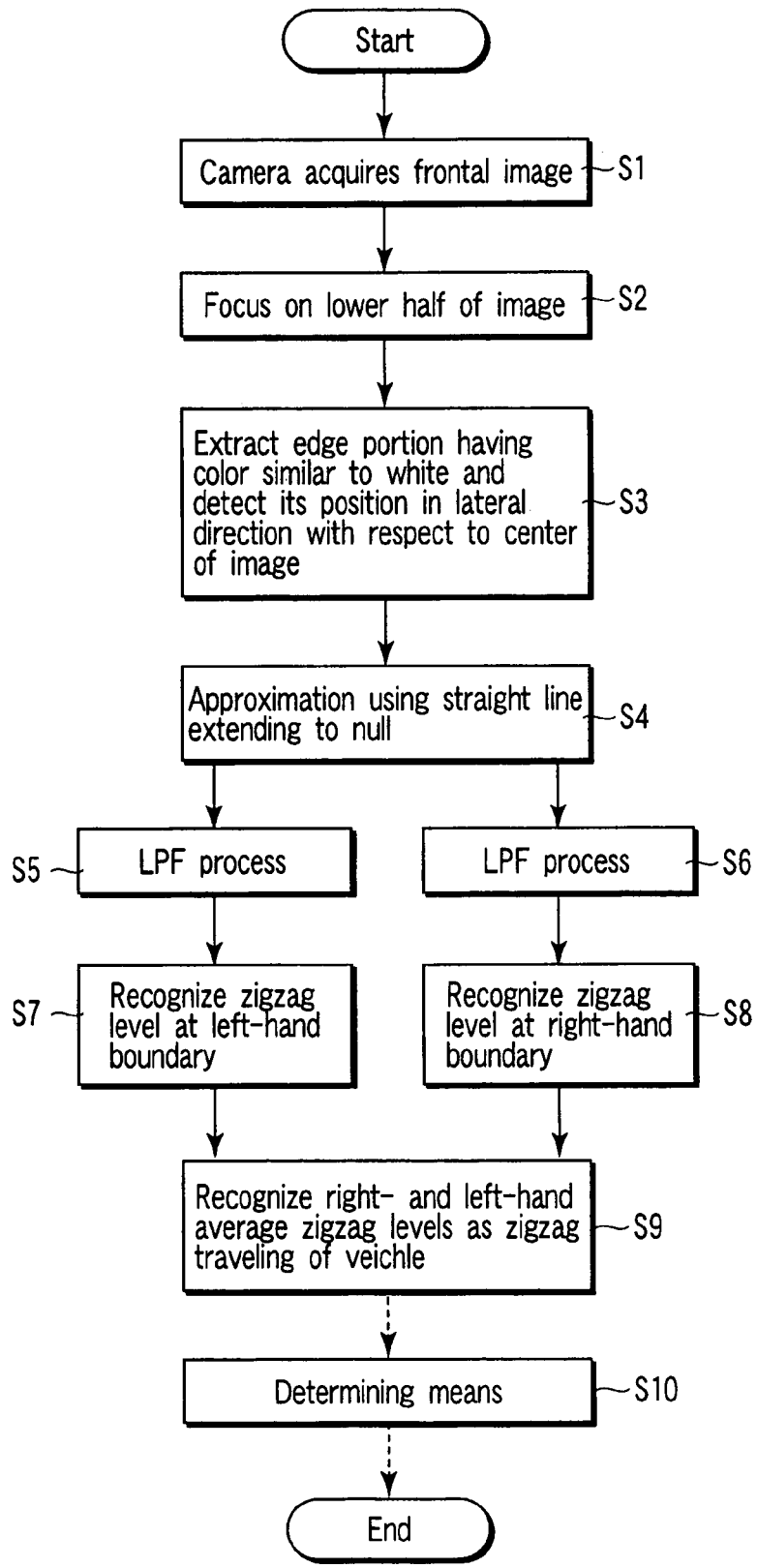
FIG. 3 is a flowchart illustrating operations of the embodiment.

With reference to the flowchart in FIG. 3, description will be given of operations of an embodiment of the present invention configured as described above. First, a road surface image picked up using the camera 11 is input to the image processing device 12. The road surface image is processed and then stored in the image data storing section 12b (step S1). Operations described below are performed storing of the image in the image data storing section 12b. In the present embodiment, on the left side of a road surface, there is snow 2 on a shoulder of the road. An unclear white line 3 is present on the right side of the road surface 1.

First, a road surface image loaded by the camera 11 is recognized on a CCD. The CCD has a size of 512×512 pixels according to the present embodiment. The horizontal direction of the CCD is defined as an x axis direction. The vertical direction of the CCD is defined as a y direction. Then, calculation is made of a gray value on each group of pixels arranged in the x axis direction (horizontal pixel group). This calculation is executed on each of the horizontal pixel groups arranged in the y axis direction. In the description below, pixel groups arranged in the x axis direction are called lines y1, y2, and y3.

The gray value is "0" for white and "255" for black. For intermediate colors, the gray value is determined depending on their densities. For example, the road surface 1 is more blackish than the snow 2 on the shoulder and the unclear white line 3. Accordingly, the road surface 1 has a larger gray value than the snow 3 on the shoulder and the unclear white line 3.

Then, an edge in the x axis direction is calculated from the gray value obtained. The edge is defined as a differential value of the calculated gray value. The edge is detected at a location where the color tone has changed.

Then, calculation is made of the absolute value (gray value level) of the gray value for the location where an edge has occurred. The absolute value obtained is stored in a predetermined memory for each control period. In this manner, a picked-up image is subjected to the edge process, and the processed image is stored in the image data storing section.

Figure 5:
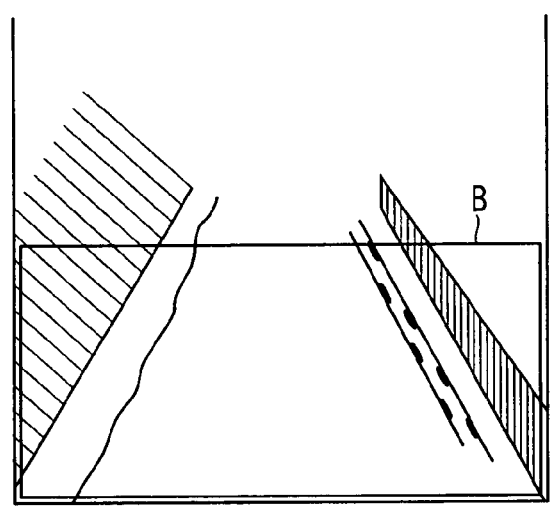
FIG. 5 is a diagram showing the image of the front of the vehicle picked up using the camera mounted in the vehicle, a zigzag rate being determined on the basis of the image.
Figure 6:
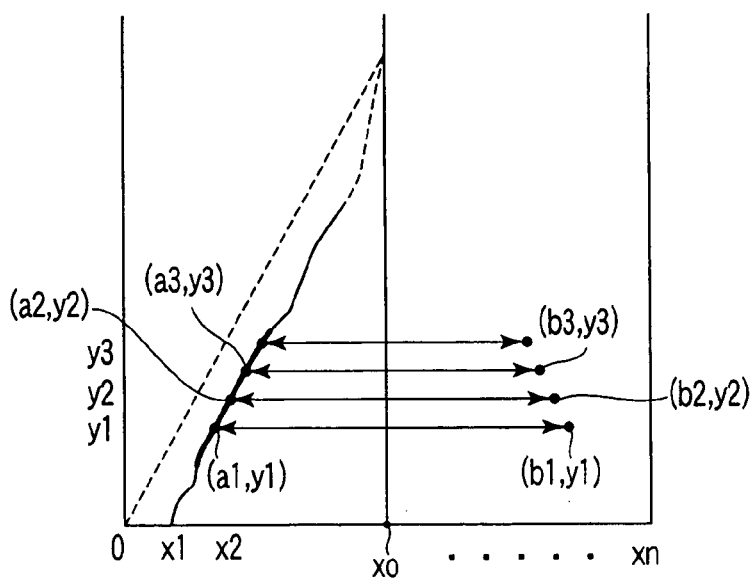
FIG. 6 is a diagram illustrating the position of a line detected by the traveling state determining apparatus according to the embodiment.
Figure 7:
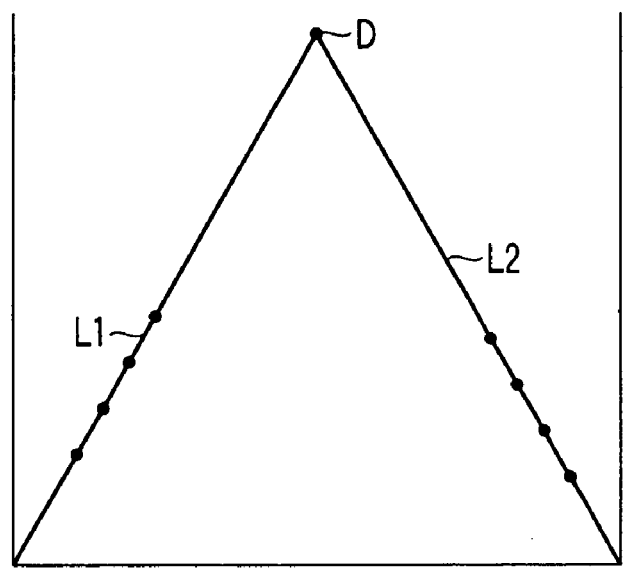
FIG. 7 is a diagram showing a straight line extending toward a null according to the embodiment.

Then, focus is made on the lower half of the road surface image stored in the image data storing section 12b as shown in FIG. 5 (step S2). In this case, step S2 is executed, that is, focus is made on the lower half of the road surface image, because a part of the road surface image which is closer to the viewer has a high image resolution and thus enables accurate zigzag determinations.

Then, parts similar to white lines are determined on the basis of the differential values of the gray values on the lines y1, y2, and y3 calculated in step S1 (white line determining means). The color tone varies at the boundary between the snow 2 on the shoulder and the road surface 1 and the boundary between the unclear white line 3 and the road surface. Consequently, these parts are detected as parts similar to white lines.

Then, the positions determined to be parts similar to white lines are detected in a lateral direction with respect to the center of the image to be checked (step S3) (white line detecting means). For example, if the central position of the image to be checked is defined as X0, the apparatus detects the positional coordinates of the parts similar to white lines determined by the white line determining means. For example, (a1, y1) is the detected positional coordinates of the boundary between the snow 2 on the shoulder and the road surface on the line y1. (b1, y1) is the detected positional coordinates of the boundary between the unclear white line 3 and the road surface on the line y1. Likewise, (a2, y2) is the detected positional coordinates of the boundary between the snow 2 on the shoulder and the road surface on the line y2. (b2, y2) is the detected positional coordinates of the boundary between the unclear white line 3 and the road surface on the line y2. Similarly, (a3, y3), . . . are the detected positional coordinates of the boundary between the snow 2 on the shoulder and the road surface on the line y3, . . . (b3, y3), . . . are the detected positional coordinates of the boundary between the unclear white line 3 and the road surface on the line y3, . . .

Figure 8:
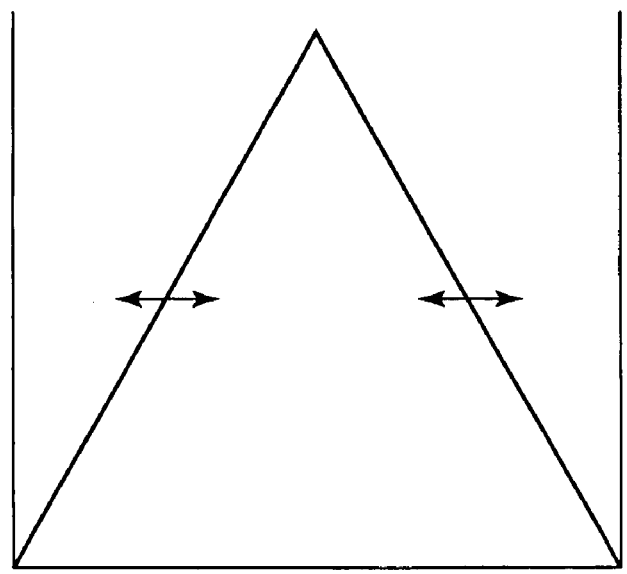
FIG. 8 is a diagram showing a right-hand boundary line and a left-hand boundary line according to the embodiment.

Then, the following are determined using a least squares method or the like (step S4) (approximating means): a straight line L1 (FIG. 8) (referred to as a left-hand approximate straight line) which joins together the positional coordinates (a1, y1), (a2, y2), (a3, y3), . . . , indicating the boundary between the snow 2 on the shoulder and the road surface, and which extends to a null D and a straight line L2 (FIG. 8) (referred to as a right-hand approximate straight line) which joins together the positional coordinates (b1, y1), (b2, y2), (b3, y3), . . . , indicating the boundary between the unclear white line 3 and the road surface, and which extends to the null D.

Then, a low pass filter process is executed on the left-hand approximate straight line L1, determined in step S4 (step S5). Further, a low pass filter process is executed on the right-hand approximate straight line L2, determined in step S4 (step S6). The low pass filter process is used because a fluctuation in the left-hand approximate straight line L1 and right-hand approximate straight line L2 indicating zigzag traveling resulting from a doze has a low frequency.

Then, the zigzag amount is determined by averaging, every predetermined time, the amount of deviation between the current calculated left-hand approximate straight line L1 and the left-hand approximate straight line L1 calculated on the basis of the road surface image picked up using the camera 11 during the last cycle, that is, a predetermined time earlier (FIG. 9) (left-hand zigzag amount calculating means) (step S7). Moreover, the zigzag amount is determined by averaging, every predetermined time, the amount of deviation between the current calculated right-hand approximate straight line L2 and the right-hand approximate straight line L2 calculated on the basis of the road surface image picked up using the camera 11 during the last cycle, that is, a predetermined time earlier (FIG. 9) (right-hand zigzag amount calculating means) (step S8). If the driver does not fall asleep at the wheel, the zigzag traveling of the vehicle is almost prevented. Consequently, the zigzag amount is close to zero. On the other hand, if the driver dozes off while driving and the vehicle travels in a zigzag line, the zigzag amount increases.

Then, the zigzag amount detected by the left-hand zigzag amount calculating means and the zigzag amount detected by the right-hand zigzag amount calculating means are averaged to calculate an average zigzag amount (step S9). If the vehicle is determined to be traveling in a zigzag line, a warning device (not shown) is actuated to give a warning to the driver.

In this case, determining means may be provided which determines whether or not the average zigzag amount calculated in step S9 is at least a reference level (step S10). Then, the vehicle is determined to be traveling in a zigzag line if the determining means makes a "YES" determination, that is, determines that the average zigzag amount is at least the reference level.

The reference level is determined by averaging the zigzag amount for a specified time from the start of driving. That is, on the basis of the judgment that the driver does not fall asleep for the specified time from the start of driving, the zigzag amount during the specified time is averaged. Alternatively, the reference level may be experimentally preset.

In the example in the above embodiment, the snow 2 is present on the left-hand shoulder of the road surface, and the white line on the right side of the road surface is unclear. However, zigzag traveling can be similarly calculated even if snow is present on both shoulders of the road surface or the white lines on both sides of the road surface are unclear. Further, zigzag traveling can be calculated even for a road surface having a part similar to a white line on only one side of the road surface.

As described above, according to the present invention, an edge is determined by calculating the differential value of horizontal gray values from a road surface image picked up using the camera. The edge is then determined to be a part similar to a white line. Then, the zigzag amount of the vehicle is calculated on the basis of the determined part similar to a white line. Therefore, zigzag traveling of the vehicle can be accurately detected even if the white lines on the road surface are not easy to see.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A traveling state determining apparatus comprising:
a camera that picks up an image of a road surface in a direction in which a vehicle is traveling; and
zigzag state detecting section configured to determine a zigzag amount on the basis of the road surface image picked up using the camera,
wherein the zigzag state detecting section is comprised of:
white line determining section configured to determine parts of the road surface which are similar to white lines;
white line position detecting section configured to detect positions determined to be white lines in a lateral direction with respect to a center of the road surface image;
approximating section configured to approximate the positions detected by the detecting section and determined to be white lines, using a straight line extending toward a null;
left-hand zigzag amount calculating and determining section configured to calculate a zigzag amount of a left-hand boundary on the basis of the left-hand straight line approximated by the approximating section;
right-hand zigzag amount determining section configured to calculate a zigzag amount of a right-hand boundary on the basis of the right-hand straight line approximated by the approximating section; and
calculating section for calculating an average zigzag amount of the vehicle on the basis of results of the calculations by the left-hand zigzag amount calculating section and the right-hand zigzag amount calculating section.

2. The vehicle traveling state determining apparatus according to claim 1, wherein the zigzag state detecting section determines whether or not the vehicle is traveling in a zigzag line, on the basis of image data on a part of the picked-up road surface image which is closer to a viewer of the image.

3. The vehicle traveling state determining apparatus according to claim 1, further comprising determining section configured to determine whether or not the vehicle is traveling in a zigzag line, on the basis of the average zigzag amount.

4. The vehicle traveling state determining apparatus according to claim 3, wherein the detecting section determines that the vehicle is traveling in a zigzag line when the zigzag amount is at least a reference level.

5. The vehicle traveling state determining apparatus according to claim 4, wherein the reference level is determined by averaging the zigzag amount for a specified time from start of driving.

* * * * *